(12) United States Patent
Miyagawa et al.

(10) Patent No.: US 7,413,050 B2
(45) Date of Patent: Aug. 19, 2008

(54) DEVICE AND METHOD FOR MOUNTING AND ASSEMBLING POWER UNIT

(75) Inventors: Kazuo Miyagawa, Saitama (JP);
Toshiyuki Inaba, Saitama (JP);
Yasuhisa Suzuki, Tokyo (JP); Hitoshi Itaba, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 10/564,034

(22) PCT Filed: Nov. 19, 2004

(86) PCT No.: PCT/JP2004/017640

§ 371 (c)(1),
(2), (4) Date: Jan. 10, 2006

(87) PCT Pub. No.: WO2005/049290

PCT Pub. Date: Jun. 2, 2005

(65) Prior Publication Data

US 2006/0157292 A1    Jul. 20, 2006

(30) Foreign Application Priority Data

Nov. 20, 2003   (JP) .............................. 2003-390973

(51) Int. Cl.
*B60K 1/00* (2006.01)
(52) U.S. Cl. ...................... 180/291; 180/274; 180/300; 296/187.09

(58) Field of Classification Search .................. 180/291, 180/274, 297, 784, 300, 312; 248/605, 562, 248/634; 267/140.3, 141.2, 104.3; 296/187.09, 296/189
See application file for complete search history.

(56) References Cited

U.S. PATENT DOCUMENTS

| | | | | |
|---|---|---|---|---|
| 2,308,962 | A | * | 1/1943 | Riesing ...................... 248/605 |
| 3,702,178 | A | * | 11/1972 | Schulz ..................... 267/140.3 |
| 5,037,058 | A | * | 8/1991 | Kojima et al. ............... 248/562 |
| 5,472,063 | A | * | 12/1995 | Watanabe et al. ........... 180/274 |
| 5,718,407 | A | * | 2/1998 | Lee ............................ 248/634 |
| 6,494,286 | B2 | * | 12/2002 | Shimizu et al. ............. 180/299 |
| 6,708,793 | B2 | * | 3/2004 | Witherspoon et al. ....... 180/291 |
| 2002/0033594 | A1 | | 3/2002 | Yamamoto et al. |

FOREIGN PATENT DOCUMENTS

| JP | 02-208172 | | 8/1990 |
|---|---|---|---|
| JP | 3-276821 | A | 12/1991 |
| JP | 6-1151 | A | 1/1994 |
| JP | 2562485 | B2 | 9/1996 |
| JP | 2003-312273 | A | 11/2003 |

* cited by examiner

*Primary Examiner*—Hau V Phan
(74) *Attorney, Agent, or Firm*—Arent Fox LLP

(57) ABSTRACT

The method includes in succession a first step of assembling a power unit into a sub-frame in almost the same position as in a mounted state on a car body frame by interposing a torque rod and at least two on-board mounts between the power unit and the sub-frame; a second step of attaching the sub-frame on which the power unit is mounted to the car body frame; and a third step of supporting the power unit via a power source side mount and a speed reducer side mount on the car body frame.

9 Claims, 13 Drawing Sheets

DEVICE AND METHOD FOR MOUNTING AND ASSEMBLING POWER UNIT

CROSS-REFERENCE TO RELATED APPLICATION

This application is a National Stage entry of International Application No. PCT/JP2004/017640, filed Nov. 19, 2004, the entire specification claims and drawings of which are incorporated herewith by reference.

TECHNICAL FIELD

The present invention relates to a power unit mounting assembling method and an improved power unit mounting assembling apparatus suitably used for the mounting assembling method, for mounting a power unit composed of a power source and a speed reducer connected in series on a car body frame to interpose a power source side mount and a speed reducer side mount that share a static load between roughly both end portions of the power unit along the principal axis of inertia and the car body frame, and interpose an almost horizontal torque rod between the sub-frame to be attached on the car body frame and a portion of the power unit apart from the principal axis of inertia.

BACKGROUND ART

A power unit mount structure is already well known in which the power unit composed of an engine as the power source and the speed reducer connected to the engine is supported via the engine side and speed reducer side mounts disposed substantially on the principal axis of inertia of the power unit on the car body frame, the sub-frame to be attached to the car body frame and the power unit are connected via an almost horizontal torque rod, as disclosed in Japanese Patent No. 2562485.

By the way, when the power unit is mounted on the car body frame using this mount structure of torque rod type, the sub-frame is connected to the suspended power unit and the chassis parts such as suspension and steering are assembled into the sub-frame to constitute a sub-assembly, and the sub-assembly is assembled into the car body frame supported on a hanger from below. However, it is difficult to perform an operation of attaching the power source side and speed reducer side mounts to the car body frame from below the car body frame on the hanger, and to allow the operation from above the car body frame on the hanger, it is necessary to remodel the assembly line and review the process.

Thus, if the operation of attaching the power source side and speed reducer side mounts to the car body frame is performed in a state where the car body frame having the sub-frame attached descends on a conveyer laid on the floor face, it is unnecessary to remodel the assembly line and review the process. However, since in relate-art, the power unit is connected via the torque rod to the sub-frame, the attitude of the power unit is not decided in performing the operation of attaching the power source side and speed reducer side mounts to the car body frame. Therefore, it is difficult to perform the operation of attaching the power source side and speed reducer side mounts to the car body frame.

DISCLOSURE OF THE INVENTION

The present invention has been made in view of such circumstances, and it is an object of the invention to provide a power unit mounting assembling method for mounting the power unit on the car body frame using the mount structure of torque rod type while making unnecessary the remodeling of assembly line and the review of process, and a mounting assembling apparatus suitably used for the mounting assembling method.

A power unit mounting assembling method, according to the present invention, mounts a power unit including a power source and a speed reducer on a car body frame in such a way as to interpose a mount carrying a static load of the power unit between the power unit and the car body frame and interpose a sub-frame attached on the car body frame between the power unit and the car body frame. The method comprises in succession: a first step of assembling the power unit into the sub-frame in the almost same attitude as in a mounted state on the car body frame by supporting the power unit via an on-board mount on the sub-frame; a second step of attaching the sub-frame on which the power unit is mounted at the first step to the car body frame; and a third step of supporting the power unit via the mount on the car body frame (F).

Also, preferably, the on-board mount is removed from between the sub-frame and the power unit after the end of the third step.

Preferably, the mount includes a power source side mount and a speed reducer side mount which are interposed between roughly both end portions of the power unit along a principal axis of inertia and the car body frame to share the static load of the power unit, the power unit is mounted on the car body frame in such a way as to interpose an almost horizontal torque rod between the sub-frame to be attached on the car body frame and a portion of the power unit apart from the principal axis of inertia, and the on-board mount includes two-on board mounts and the first step includes assembling the power unit into the sub-frame in the almost same attitude as in the mounted state on the car body frame by connecting the power unit and the sub-frame via the torque rod and supporting at least two positions on a lower portion of the power unit on the sub-frame via the on-board mounts.

The term "almost horizontal" as used herein means that the torque rod can share a torque reaction force in a roll direction of the power unit and during acceleration or deceleration.

Preferably, the power source side mount, the speed reducer side mount and the on-board mounts comprise supported members attached to the power unit, supporting members attached to the car body frame and the sub-frame, and mount rubbers interposed between the supported members and the supporting members corresponding to each other, respectively, and the rubber contents of the mount rubbers provided for the on-board mounts are set to be smaller than the rubber contents of the mount rubbers provided for the power source side mount and the speed reducer side mount.

Further, preferably, the on-board mount removed from between the sub-frame and the power unit after the end of the third step comprises a snap-on pin removably inserted into the power unit, a supporting member detachably fastened to the sub-frame, and a mount rubber interposed between the snap-on pin and the supporting member.

Moreover, preferably, the supporting member is fastened to a mounting plate fixed to the sub-frame by a single bolt and a nut, one of the supporting member and the mounting plate being provided with a regulation hole at a position offset from an axial line of the bolt and the nut, the other of the supporting member and the mounting plate being provided with a locking pin for regulating the supporting member from rotating around the axial line of the bolt by being inserted into the regulation hole, and the regulation hole is formed into a long hole extending in a direction orthogonal to a locking direction with the regulation hole and the locking pin.

A power unit mounting assembling apparatus, according to the present invention, mounts a power unit including a power source and a speed reducer on a car body frame in such a way as to interpose a mount carrying a static load of the power unit between the power unit and the car body frame and interpose a sub-frame attached on the car body frame between the power unit and the car body frame. The apparatus comprises: an on-board mount interposed between the power unit and the sub-frame and supported on the sub-frame in the almost same attitude as in a mounted state on the car body frame.

Preferably, the above-mentioned power unit mounting assembling apparatus comprises a removal member for removing the on-board mount from the sub-frame and the power unit after supporting the power unit on the car body frame via the mount.

Preferably, the mount and the on-board mount comprise supported members attached to the power unit, supporting members attached to the car body frame and the sub-frame, and mount rubbers interposed between the supported members and the supporting members corresponding to each other, respectively, and the rubber content of the mount rubber provided for the on-board mount is set to be smaller than the rubber content of the mount rubber provided for the mount.

Further, preferably, the on-board mount removed from between the sub-frame and the power unit comprises a snap-on pin removably inserted into the power unit, a supporting member detachably fastened to the sub-frame, and a mount rubber interposed between the snap-on pin and the supporting member.

Moreover, preferably, the supporting member is fastened to a mounting plate fixed to the sub-frame by a single bolt and a nut, one of the supporting member and the mounting plate being provided with a regulation hole at a position offset from the axial line of the bolt and the nut, the other of the supporting member and the mounting plate being provided with a locking pin for regulating the supporting member from rotating around the axial line of the bolt by being inserted into the regulation hole, and the regulation hole is formed into a long hole extending in a direction orthogonal to a locking direction with the regulation hole and the locking pin.

According to the above-mentioned power unit mounting assembly apparatus of the present invention, since the first step includes supporting the power unit on the sub-frame via the on-board mounts, the attitude of the power unit is decided in the almost same attitude as in a mounted state on the car body frame. Also, since at the second step, the attitude of the power unit to the car body frame is made definite in a state where the sub-frame is attached to the car body frame, it is necessary to perform the third step of supporting the power unit on the car body frame via the power source side and speed reducer side mounts, when the car body frame on which the sub-frame is attached descends to the position at which the power source side and speed reducer side mounts can be attached between the car body frame and the power unit from above, whereby the remodeling of assembly line and the process review are dispensed with, and the power unit is mounted on the car body frame with the mount structure of torque rod type.

Also, since at least one of the on-board mounts is removed from between the sub-frame and the power unit after the end of the third step, it is possible to avoid unnecessary restriction of the power unit to the car body frame in the entire car, suppress an unnecessary increase in the vibration transmission path between the power unit and the car body frame, and contribute to reduction of the weight of the entire car.

Also, since the first step includes connecting the power unit and the sub-frame via the torque rod, and supporting at least two positions on a lower portion of the power unit on the sub-frame via the on-board mounts, the attitude of the power unit is decided in the almost same attitude as in a mounted state on the car body frame.

Moreover, since the on-board mount has the mount rubber, even if there is any error between the attitude of the power unit defined by the on-board mount and the torque rod and the attitude of the power unit in the mounted state on the car body frame, it is possible to absorb the error by the mount rubber of the on-board mount and mount the power unit on the car body frame easily and in correct attitude. Furthermore, it is possible to avoid the mount rubber of the on-board mount to be larger than necessary and contribute to reduction of the cost.

Further, an operation of attaching and removing the on-board mount that is removed at the third step is facilitated.

Moreover, since the supporting member is fastened to the mounting plate fixed to the sub-frame by a single bolt and the nuts, the operation of attaching and removing the on-board mount is further facilitated. Simply by fastening the single bolt with the nut, the power unit is blocked from being rotated around the axial line of the bolt in mounting the power source side and speed reducer side mounts on the car body frame, making it easier to mount the power source side and speed reducer side mounts on the car body frame. In addition, since a long hole is formed in a direction orthogonal to the locking direction, any error between the attitude of the power unit defined by the on-board mount and the torque rod and the attitude of the power unit in the mounted state on the car body frame is absorbed by the mount rubber of the on-board mount, but the power unit is freely moved at least in a limited range along the longitudinal direction of the regulation hole owing to a resilient force of the mount rubber in fastening the bolt, so that the on-board mount is easily removed.

Figure 1:
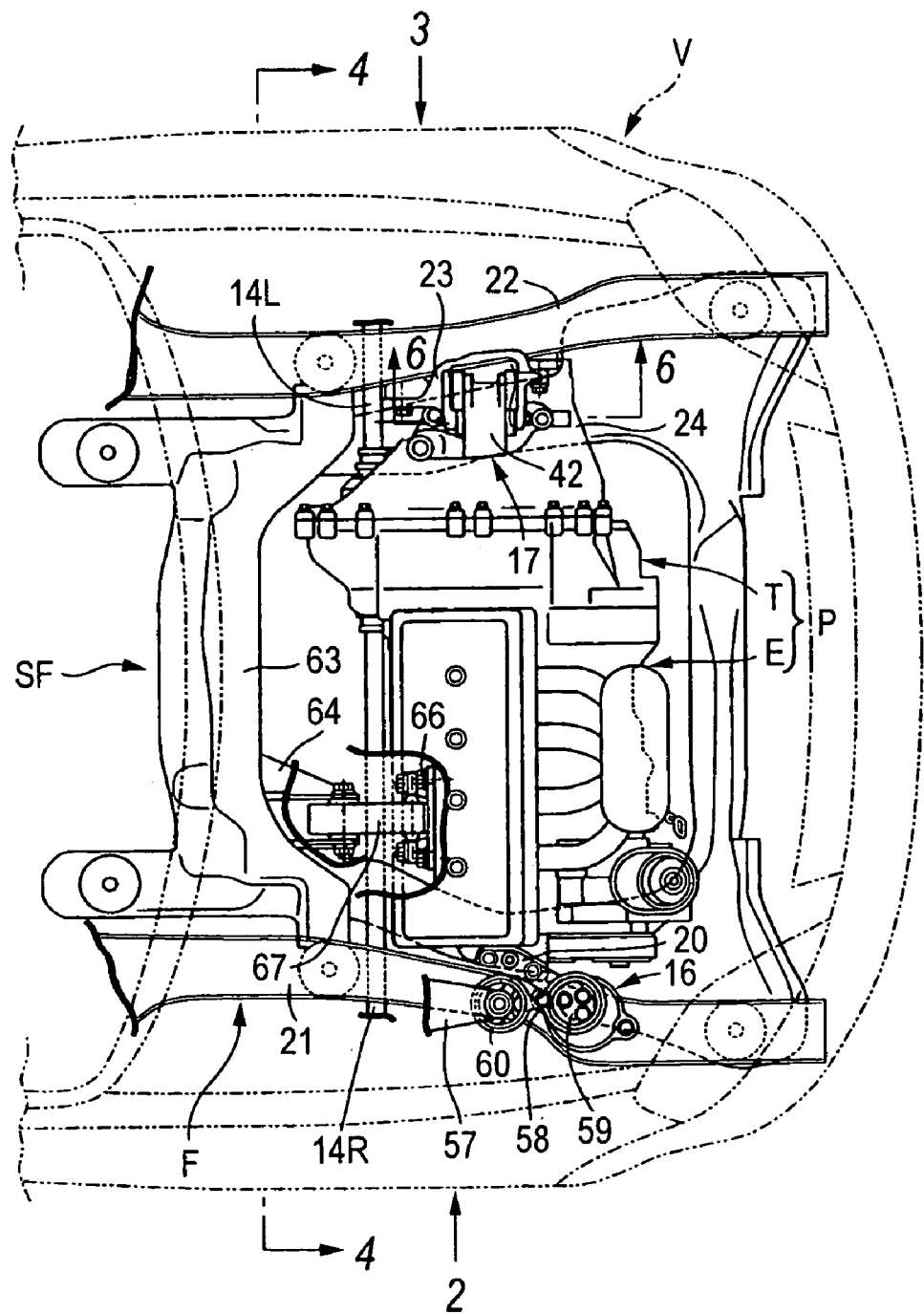
FIG. 1 is a plan view, partially cut away, of a power unit mounted on the vehicle.

By the way, in the drawings, numeral 16 designates an engine side mount as power source side mount, numeral 17 designates a speed reducer side mount, numeral 23 designates a bracket as supporting member, numeral 26 designates an outer cylinder as supporting member, numeral 27, 47, 74, 85 designate mount rubbers, numeral 28 designates an inner cylinder as supported member, numeral 42 designates a holder as supported member, numeral 67 designates a torque rod, numeral 71 designates a speed reducer side lower portion mount as on-board mount, numeral 73 designates a holder as supported member, numeral 78 designates a mounting plate as supporting member, numeral 81 designates an on-board mount, numeral 83 designates an insert pin as supported member, numeral 84 designates a holder as supporting member, numeral 89 designates a mounting plate, numeral 90 designates a bolt, numeral 91 designates a nut, numeral 94 designates a regulation hole, numeral 95 designates a locking pin, numeral C designates a principal axis of inertia, numeral E designates an engine as power source, numeral F designates a car body frame, numeral SF designates a sub-frame, numeral P designates a power unit, and numeral T designates a speed reducer,

BEST MODE FOR CARRYING OUT THE INVENTION

The preferred embodiments of the present invention will be described below by way of example with reference to the accompanying drawings.

Figure 2:
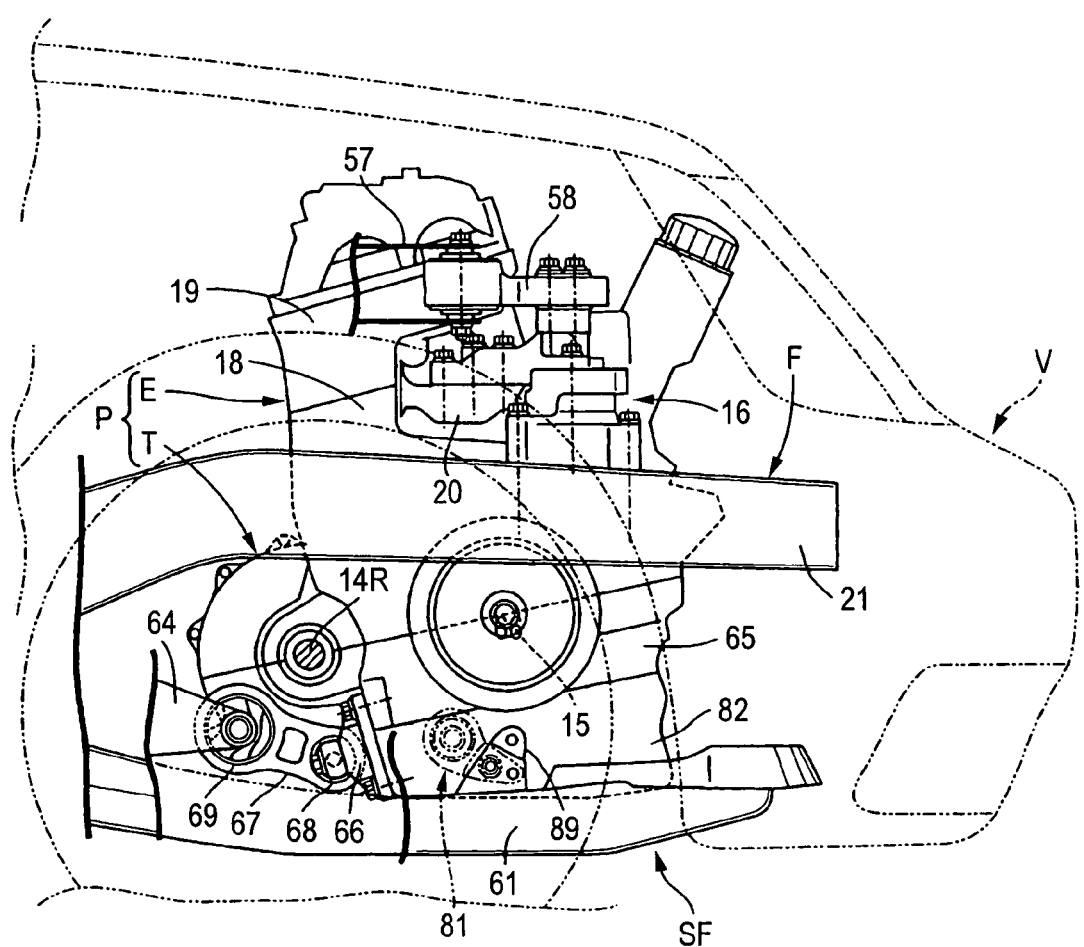
FIG. 2 is a side view of the power unit as looked from the arrow 2 in FIG. 1.
Figure 3:
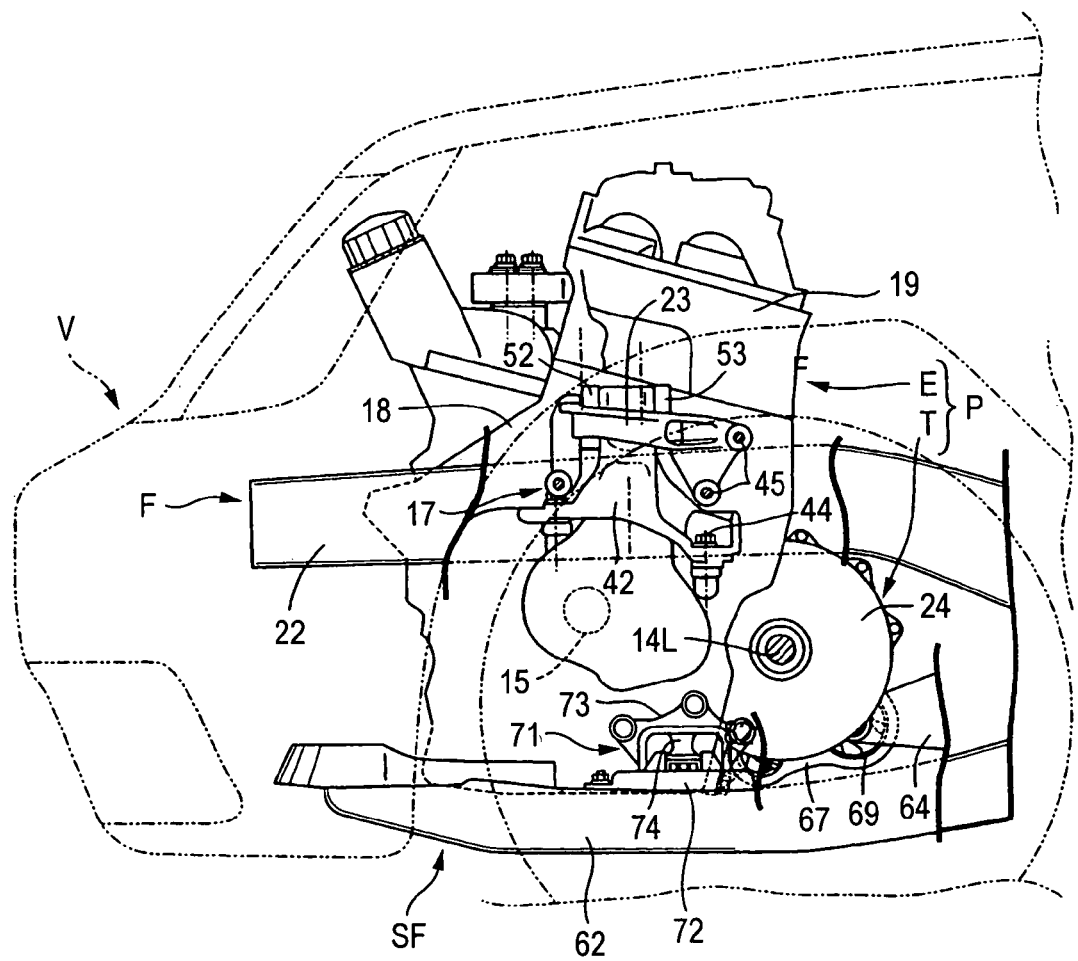
FIG. 3 is a side view of the power unit as looked from the arrow 3 in FIG. 1.
Figure 4:
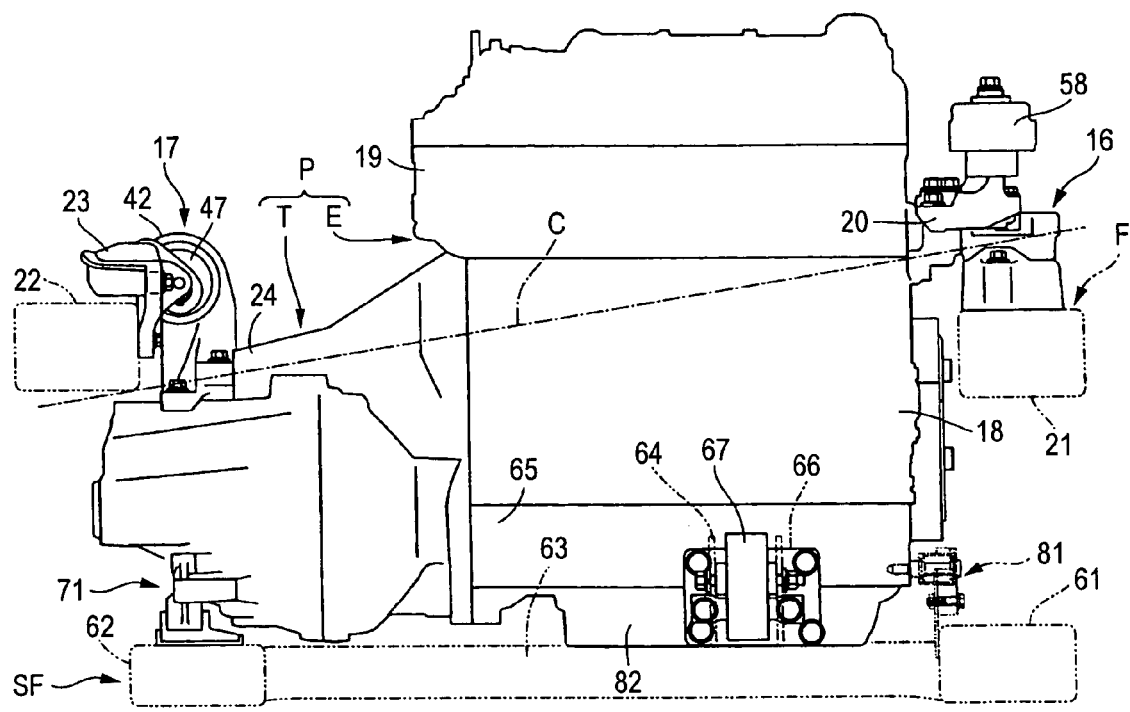
FIG. 4 is a rear view of the power unit as looked from the arrow 4-4 in FIG. 1.
Figure 5:
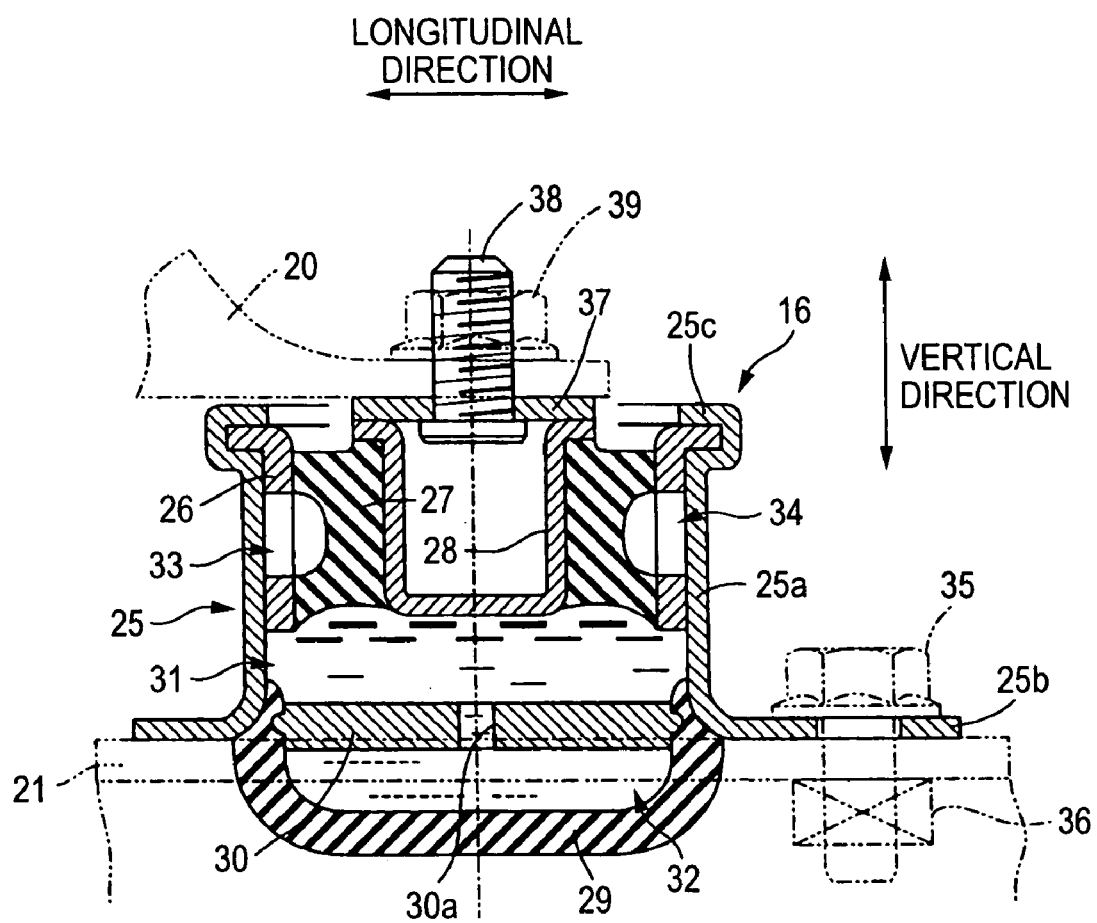
FIG. 5 is a longitudinal cross-sectional view of an engine side mount.
Figure 6:
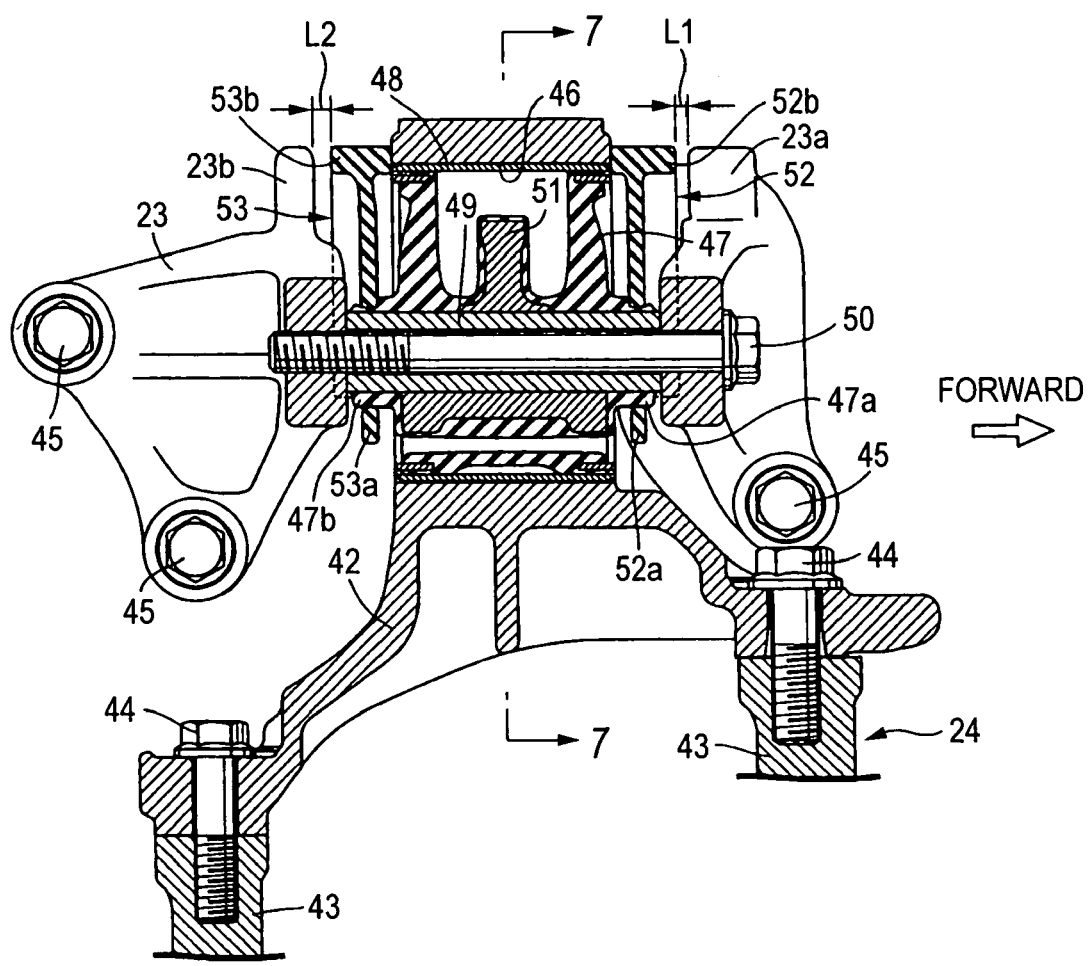
FIG. 6 is an enlarged cross-sectional view of the power unit taken along the line 6-6 in FIG. 1.
Figure 7:
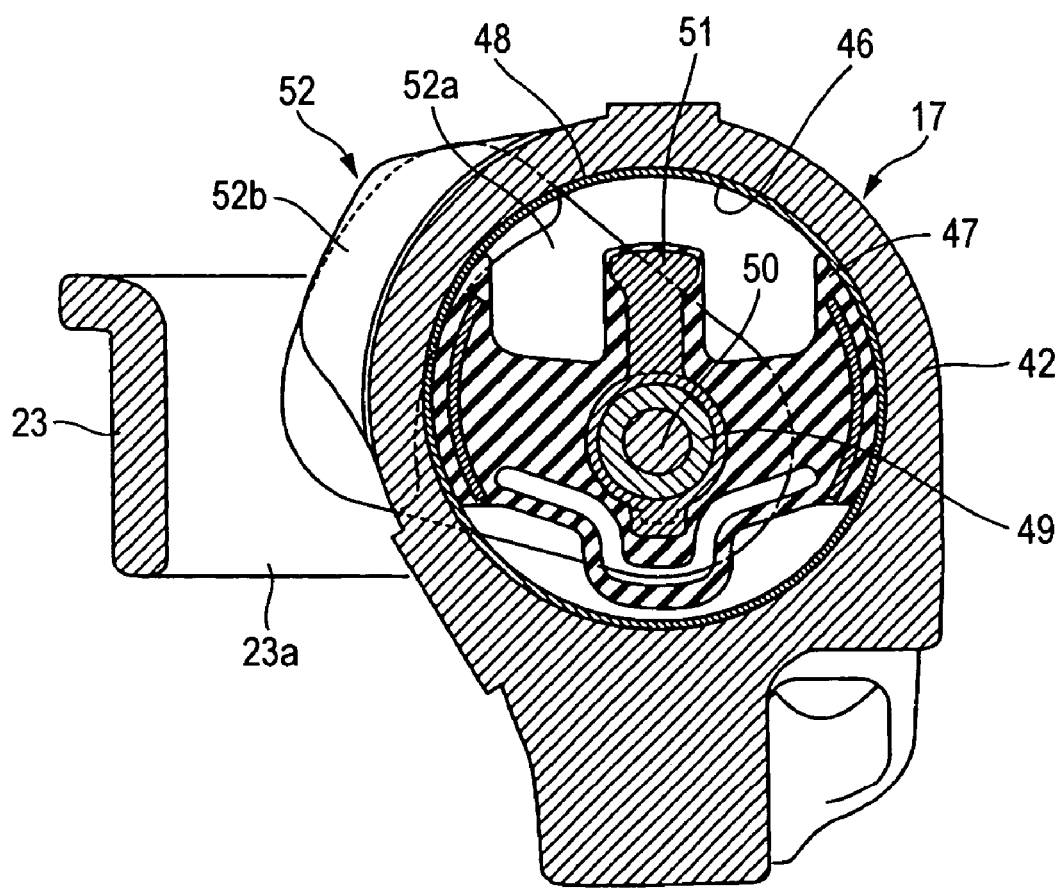
FIG. 7 is a longitudinal cross-sectional view of the power unit taken along the line 7-7 in FIG. 6.
Figure 8:
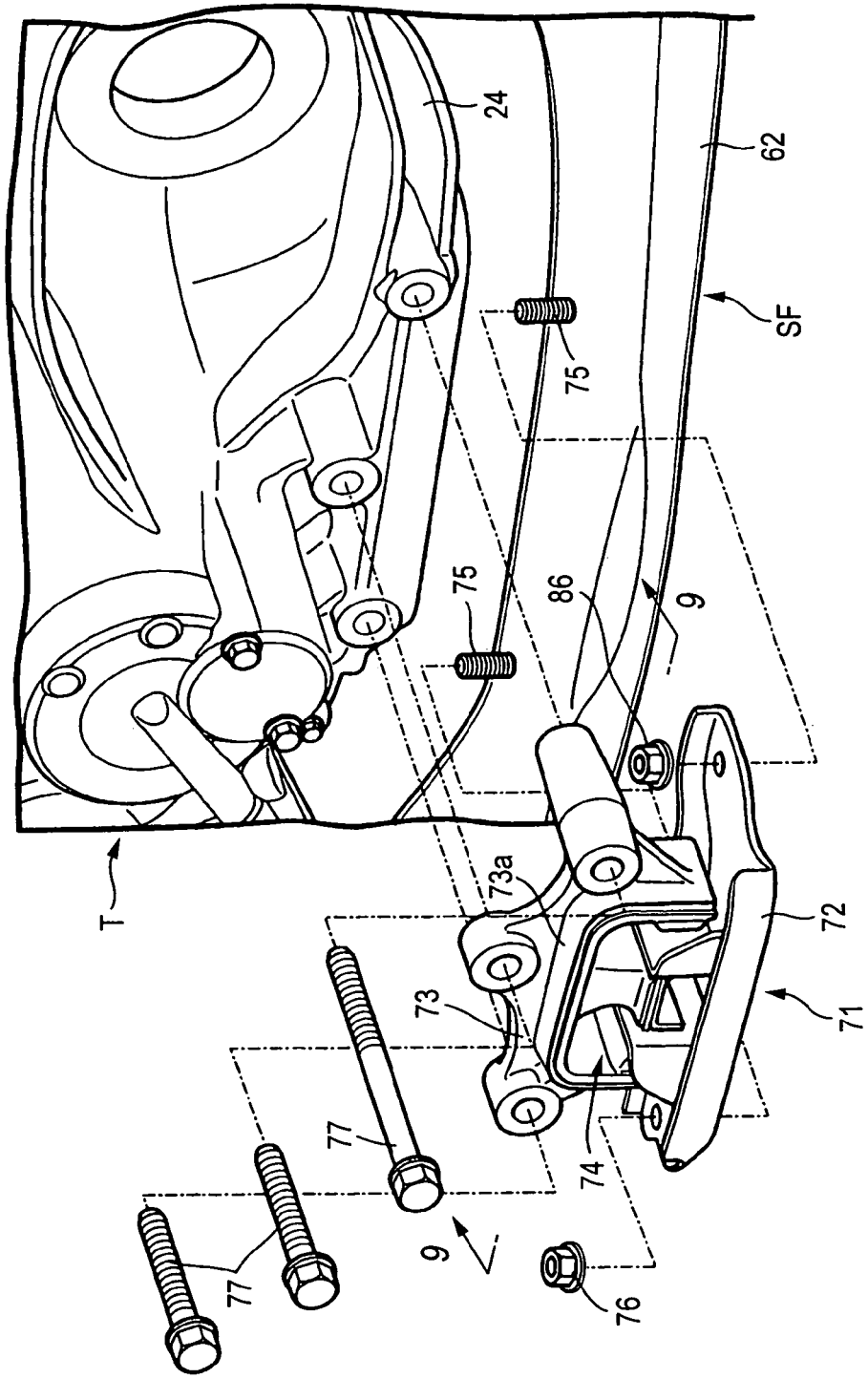
FIG. 8 is a perspective view showing a state where a speed reducer side lower portion mount is removed from the lower portion of the speed reducer.
Figure 9:
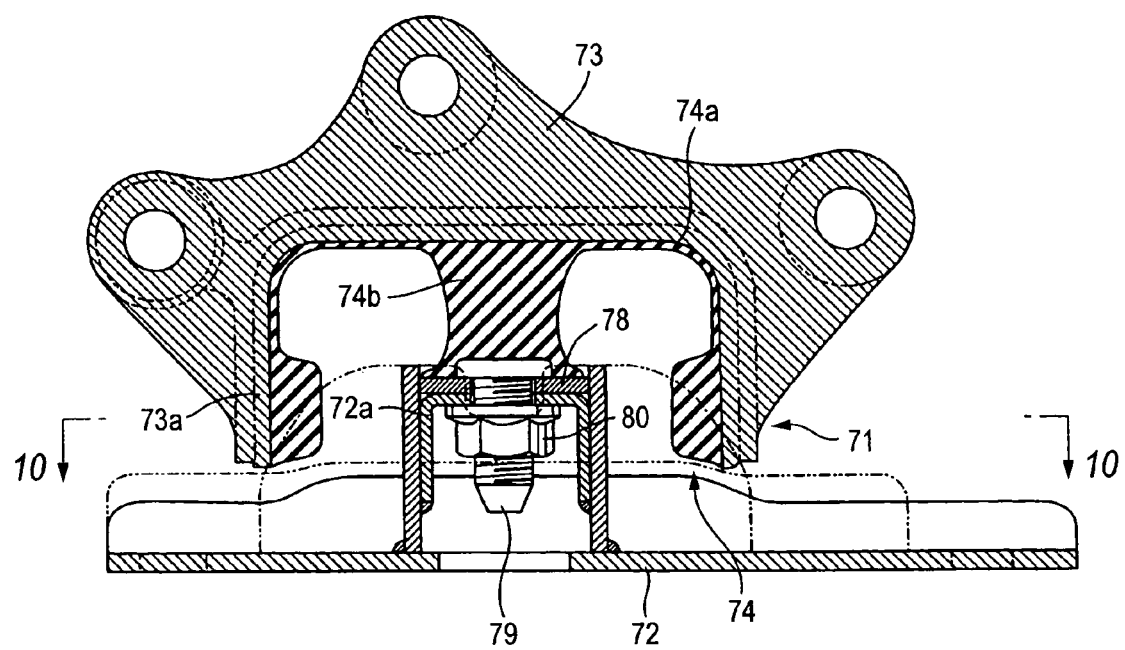
FIG. 9 is a longitudinal cross-sectional view of the power unit taken along the line 9-9 in FIG. 8.
Figure 10:
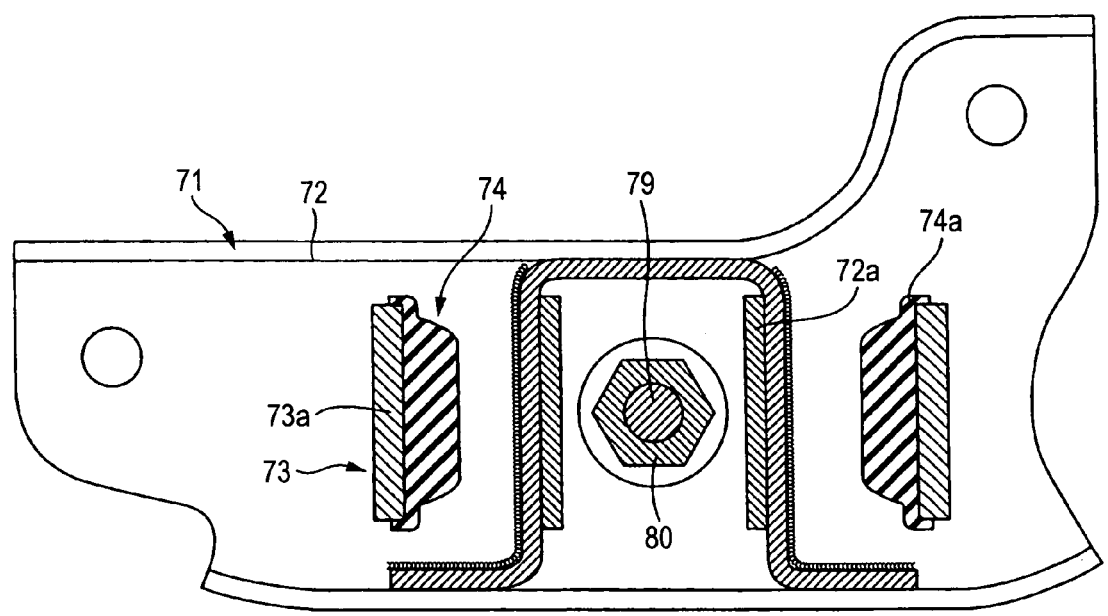
FIG. 10 is a longitudinal cross-sectional view of the power unit taken along the line 10-10 in FIG. 9.
Figure 11:
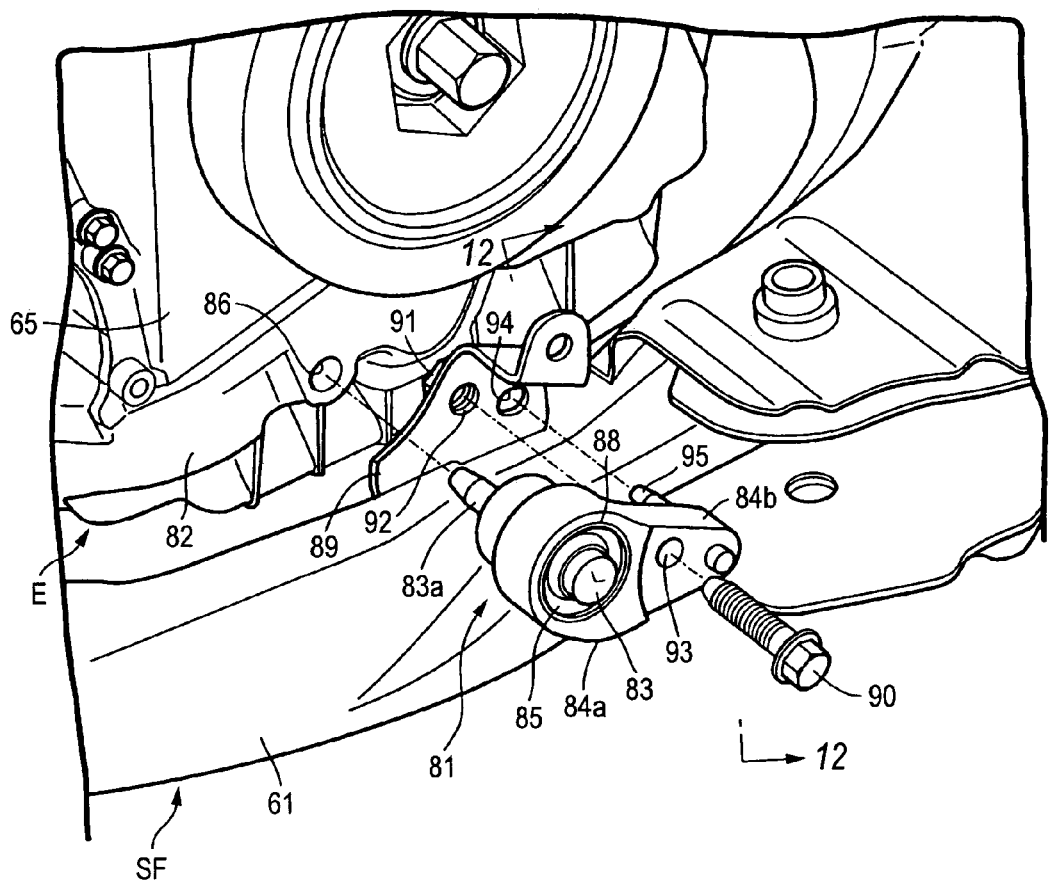
FIG. 11 is a perspective view of an on-board mount.
Figure 12:
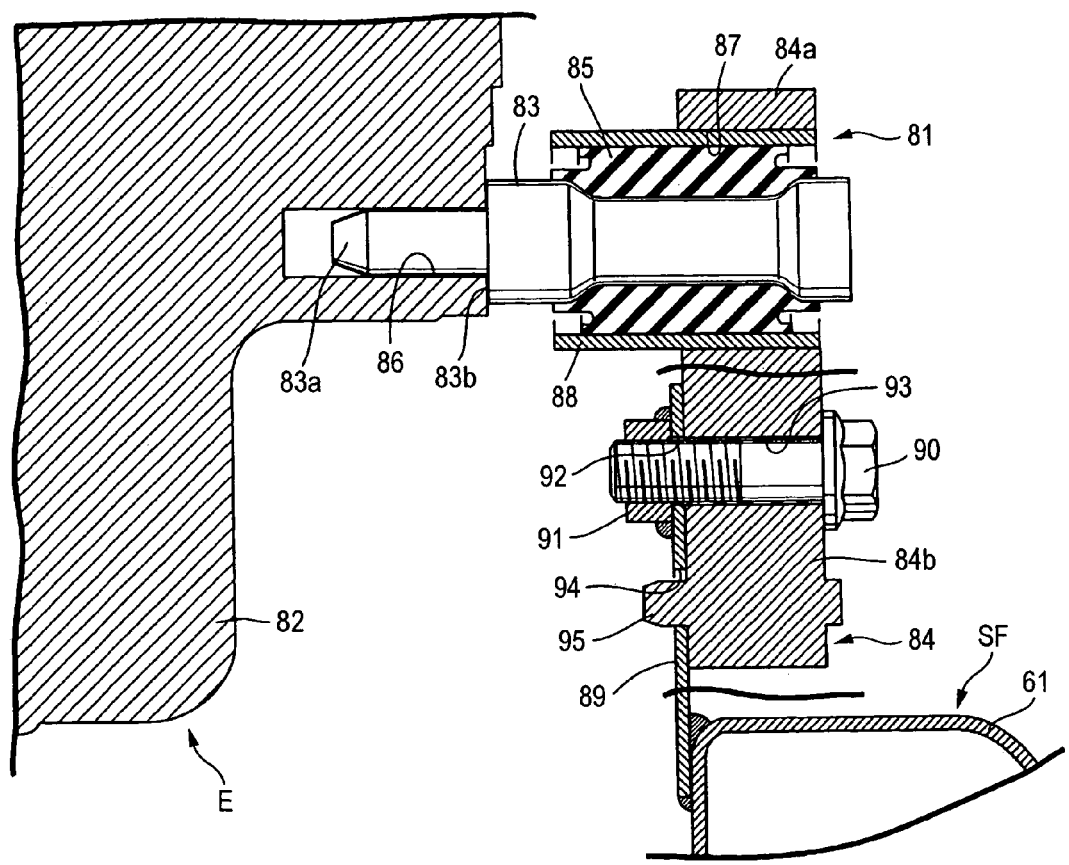
FIG. 12 is an enlarged cross-sectional view of the power unit taken along the line 12-12 in FIG. 11.
Figure 13:
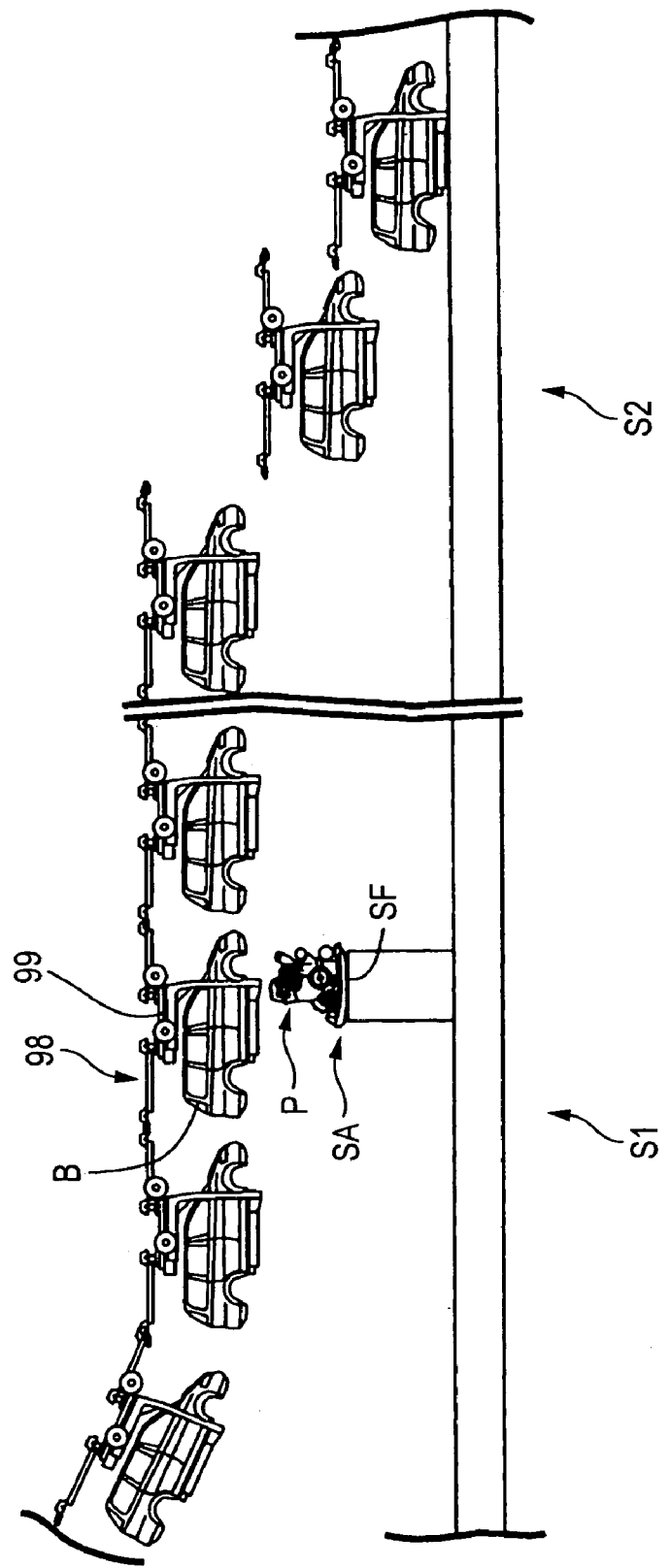
FIG. 13 is a side view showing part of an assembly line in which the power unit is assembled on the vehicle.

FIGS. 1 to 13 show a power unit according to one embodiment of the invention. FIG. 1 is a plan view, partially cut away, of a power unit mounted on the vehicle. FIG. 2 is a side view of the power unit as looked from the arrow 2 in FIG. 1. FIG. 3 is a side view of the power unit as looked from the arrow 3 in FIG. 1. FIG. 4 is a rear view of the power unit as looked from the arrow 4-4 in FIG. 1. FIG. 5 is a longitudinal cross-sectional view of an engine side mount. FIG. 6 is an enlarged cross-sectional view of the power unit taken along the line 6-6 in FIG. 1. FIG. 7 is a longitudinal cross-sectional view of the power unit taken along the line 7-7 in FIG. 6. FIG. 8 is a perspective view showing a state where a speed reducer side lower portion mount is removed from the lower portion of the speed reducer. FIG. 9 is a longitudinal cross-sectional view of the power unit taken along the line 9-9 in FIG. 8. FIG. 10 is a longitudinal cross-sectional view of the power unit taken along the line 10-10 in FIG. 9. FIG. 11 is a perspective view of a non-board mount. FIG. 12 is an enlarged cross-sectional view of the power unit taken along the line 12-12 in FIG. 11. FIG. 13 is a side view showing part of an assembly line in which the power unit is assembled on the vehicle.

First of all, a power unit P mounted on the vehicle B of a front engine front drive (FF) is composed of an engine E as a power source and a speed reducer T that are connected in series, and disposed transversely with a crank shaft 15 extending along a cross direction of the vehicle V, as shown in FIGS. 1 to 4. The speed reducer T disposed to the left of the engine E is constituted such that the position at its upper end portion is lower than the position of the upper end portion of the engine E. Thereby, the principal axis of inertia of the power unit P is lower toward the speed reducer T. Also, the drive shafts 14L, 14R located behind the principal axis of inertia C extend to the left and right from a differential gear contained in the speed reducer T.

This power unit P is supported on a car body frame F via an engine side mount 16 as a power source side mount and a speed reducer side mount 17 sharing its static load. The engine side mount 16 and the speed reducer side mount 17 are disposed at roughly both end portions of the principal axis of inertia C of the power unit P.

A bracket 20 is attached on a cylinder block 18 and a cylinder head 19 for the engine E at one end along the axial line of the crank shaft 15, and an engine side mount 16 is interposed between a right front side frame 21 on the car body frame F and the bracket 20. Also, the speed reducer side mount 17 is interposed between a left front side frame 22 on the car body frame F and a mission case 24 of the speed reducer T.

In FIG. 5, the engine side mount 16 comprises a casing 25 having a cylindrical casing main portion 25a and a flange portion 25b overhanging radially outwards from the lower end of the casing main portion 25a, in which a mount rubber 27 is interposed between the bracket 20 attached on the engine E and the casing 25. The outer and inner circumferences of the mount rubber 27 are bonded with an almost cylindrical outer cylinder 26 as a supporting member and a cup-like inner cylinder 28 as a supported member. The outer cylinder 26 fitted inside the casing main portion 25a is fixed to the casing 25 by a caulking portion 25c formed at the upper end of the casing main portion 25a. Also, a cup-like elastic member 29 is fixed by bonding at the lower end of the casing main portion 25a, and a partition wall 30 is fixed by bonding at the upper end of the elastic member 29.

A first liquid chamber 31 is formed between the partition wall 30 and the mount rubber 27. A second liquid chamber 32 is formed between the partition wall 30 and the elastic member 29. The first and second liquid chambers 31, 32 are in communication with each other via an orifice 30a provided in the partition wall 30.

Also, the third and fourth liquid chambers 33, 34 located in the longitudinal direction of the car body are formed in an intermediate portion between the mount rubber 27 and the casing main portion 25a, and in communication with each other via an orifice, not shown.

Thus, the flange portion 25b of the casing 25 is fixed to the front side frame 21 of the car body frame F by a plurality of bolts 35 and nuts 36. A support plate 37 fixed to the inner cylinder 28 is fixed to the bracket 20 attached on the engine E by the bolts 38 and nuts 39.

With this engine side mount 16, a static load of the power unit P is borne via the mount rubber 27 on the side frame 21 of the car body frame F. Also, when the power unit P is operating, the volumes of the first and second liquid chambers 31, 32 are alternately increased and decreased to pass the liquid through the orifice 30a, thereby producing a damping force for suppressing a vertical vibration of the power unit P. Also, the volumes of the third and fourth liquid chambers 33, 34 are alternately increased and decreased to pass the liquid through the orifice, not shown, thereby producing a damping force for suppressing a longitudinal vibration of the power unit P. And the peak frequency for the vertical damping coefficient can be set by adjusting the size of the orifice 30a.

In FIGS. 6 and 7, the speed reducer side mount 17 comprises a holder 42 as a supported member, a bracket 23 as a supporting member, and a mount rubber 47. The holder 42 is attached on the top of the mission case 24 in the speed reducer T. The bracket 23 has integrally the support plate portions 23a, 23b to sandwich the holder 42 therebetween and is attached on the car body frame F. The mount rubber 47 is provided between the holder 42 and the bracket 23. The holder 42 is fastened to the mounting bosses 43, 43 integrally provided on the top of the mission case 24 by the bolts 44, 44, and the bracket 23 is attached to the left front side frame 22 in the car body frame F by a plurality of bolts 45, 45.

The holder 42 is provided with a through bore 46 extending longitudinally, in which the mount rubber 47 received in the through bore 46 is interposed between the holder 42 and the bracket 23. The outer circumference and inner circumference of the mount rubber 47 are bonded to an outer cylinder 48 and an inner cylinder 49, in which the outer cylinder 48 is press fitted into the through bore 46 and thereby fixed to the holder 42.

Also, both ends of the inner cylinder 49 project longitudinally from the holder 42 to abut against both the support plate portions 23a, 23b of the bracket 23. The inner cylinder 49 is fixed to the bracket 23 by fastening a bolt 50 inserted into the front support plate portion 23a and the inner cylinder 49, and threadingly engaging the rear support plate portion 23b.

The mount rubber 47 absorbs the vibration of the speed reducer T, or the power unit P, owing to its compression, tension and elastic deformation in the shearing direction to act to dampingly suppress the vertical and transverse amplitude from excessively increasing, and is shaped to exhibit such an amplitude suppressing function, in which a stopper member 51 buried in the mount rubber 47 to function as a stopper in suppressing the amplitude is borne on the inner cylinder 49.

By the way, the speed reducer side mount 17 comprises a front elastic stopper 52 and a rear elastic stopper 53. The front elastic stopper 52 abuts against the support plate portion 23a of the bracket 23 when the holder 42 is displaced a first distance L1 to the fore side of the front side frame 22 in the car body frame F. The rear elastic stopper 53 abuts against the support plate portion 23b of the bracket 23 when the holder 42 is displaced a second distance L2 to the rear side of the front side frame 22.

The front and rear elastic stoppers 52, 53 have integrally the thin plate portions 52a, 53a formed like the fan and the thick plate portions 52b, 53b overhanging longitudinally on both sides from the thin plate portions 52a, 53a and leading to the top end of the thin plate portions 52a, 53a. The base portion of the thin plate portions 52a, 53a corresponding to the essential part of fan is supported by the mount rubber 47. That is, the mount rubber 47 is provided integrally with a front cylinder portion 47a extending forwards along the outer circumference of the inner cylinder 49 and a rear cylinder portion 47b extending backwards along the outer circumference of the inner cylinder 49. The base portion of the thin plate portion 52a is engaged and supported by the front cylinder portion 47a penetrating through it, and the base portion of the thin plate portion 53a is engaged and supported by the rear cylinder portion 47b penetrating through it.

The front elastic stopper 52 supported by the front cylinder portion 47a is disposed between the support plate portion 23a in the bracket 23 and the holder 42. There is the first distance L1 apart between the front face of the thick plate portion 52b and the support plate portion 23a of the bracket 23 in an operation stop state of the power unit P, where a rear portion of the thick plate portion 52b provided in the front elastic stopper 52 is in contact with the holder 42. That is, when the holder 42 is displaced first distance L1 to the fore side of the front side frame 22 in the car body frame F, the thick plate portion 52b of the front elastic stopper 52 abuts against the support plate portion 23a of the bracket 23.

Also, the rear elastic stopper 53 supported by the rear cylinder portion 47b is disposed between the support plate portion 23b in the bracket 23 and the holder 42. There is the second distance L2 longer than the first distance L1 apart between the rear face of the thick plate portion 52b and the support plate portion 23b of the bracket 23 in an operation stop state of the power unit P, where a front portion of the thick plate portion 52b provided in the rear elastic stopper 53 is in contact with the holder 42. That is, when the holder 42 is displaced second distance L2 to the rear side of the front side frame 22 in the car body frame F, the thick plate portion 52b of the rear elastic stopper 53 abuts against the support plate portion 23b of the bracket 23.

And the friction coefficient of at least a portion of the front elastic stopper 52 and the rear elastic stopper 53 abutting against the support plate portions 23a, 23b in the bracket 23 is set to be lower on the side of the front elastic stopper 52. In this example, the front elastic stopper 52 is formed of an elastic material having a lower friction coefficient than the friction coefficient of the elastic material forming the rear elastic stopper 53.

Referring to FIGS. 1 to 4 again, the car body frame F comprises a bracket 57 disposed above the right front side frame 21. A torque rod 58 extending almost horizontally in the longitudinal direction is provided between this bracket 57 and the bracket 20 attached to the cylinder block 18 and cylinder head 19 of the engine E in the power unit P not to share the vertical static load of the power unit P. The torque rod 58 has the elastic members 59, 60 at both ends. A front end of the torque rod 58 is linked to the bracket 20 via the elastic member 59 to be rotatable around a vertical axis in respect to the crank shaft 15. A rear end of the torque rod 58 is linked to the bracket 57 via the elastic member 60 to be rotatable around the axial line extending vertically.

By the way, a sub-frame SF is attached to the car body frame F. This sub-frame SF comprises the right and left longitudinal members 61, 62 extending longitudinally below the right and left front side frames 21, 22 in the car body frame F, and a cross member 63 linking both the longitudinal members 61, 62 behind the power unit P.

A torque rod 67 extending almost horizontally in the longitudinal direction is provided between a bracket 64 provided in the cross member 63 and a bracket 66 attached to a crank case 65 and an oil pan 82 of the engine E in the power unit P not to share the vertical static load of the power unit P. The torque rod 67 has the elastic members 68, 69 at both ends. A front end of the torque rod 67 is linked to the bracket 66 via the elastic member 68 to be rotatable around the axial line in parallel to the crank shaft 15. A rear end of the torque rod 67 is linked to the bracket 64 via the elastic member 69 to be rotatable around the axial line in parallel to the crank shaft 15.

Both the torque rods 58, 67 do not share the static load of the power unit P because they extend almost horizontally in the longitudinal direction. When the power unit P is operating, rolling fluctuation is elastically regulated by the elastic members 60, 69 provided for the torque rods 58, 67 on the side of the cross member 63 in the car body frame F and the sub-frame SF attached to the car body frame F.

Referring to FIGS. 8 to 10, a speed reducer side lower portion mount 71 not sharing the static load of the power unit P is interposed to have at least a vertical spring component between the left longitudinal member 62 in the sub-frame SF attached to the car body frame F and the lower portion of the mission case 24 in the speed reducer T. The speed reducer side lower portion mount 71 is disposed at a position opposed to the speed reducer side mount 17 across the principal axis of inertia C.

This speed reducer side lower portion mount 71 has a mount rubber 74 between a bracket 72 attached to the longitudinal member 62 and a holder 73 as a supported member attached on the lower portion of the mission case 24. The bracket 72 is attached to the longitudinal member 62 by two pairs of bolts 75, 75 and nuts 76, 76, and the holder 73 is attached to the lower portion of the mission case 24 by three bolts 77, 77 and 77, for example.

The holder 73 has integrally a rubber holding portion 73a like U-character that is opened downwards. The mount rubber 74 is formed like T-character as a whole and has a thin plate portion 74a like U-character bonded to the inner face of the rubber holding portion 73a and a strut portion 74b extending vertically and integrally in a direction orthogonal to a central portion of the thin plate portion 74a. A lower end of the strut portion 74b is bonded to a mounting plate 78 as the supporting member, and the mounting plate 78 is fixed to the support plate portion provided on the bracket 72 by a bolt 79 and a nut 80.

This mount rubber 74 provided for the speed reducer side lower portion mount 71 has the spring constants set to be lower in the longitudinal and transverse direction than in the vertical direction, due to its shape.

By the way, when the power unit P is mounted on the car body frame F, the sub-frame SF is connected to the suspended power unit P, the chassis parts such as suspension and steering are assembled into the sub-frame SF to constitute a sub-assembly, and the sub-frame SF of the sub-assembly is assembled into the car body frame F from below. However, it is difficult to perform an operation of attaching the engine side and speed reducer side mounts 16, 17 to the car body frame F from below the car body frame F on the hanger, and to allow the operation from above the car body frame F, it is desirable to perform the operation of attaching the engine side and speed reducer side mounts 16, 17 to the car body frame F, when the car body frame F having the sub-frame SF attached descends on a conveyer laid on the floor face.

However, even if the power unit P is connected to the cross member 63 of the sub-frame SF via the torque rod 67, the attitude of the power unit P is not decided in performing an operation of attaching the engine side and speed reducer side mounts 16, 17 on the car body frame F. Therefore, it is difficult to perform the operation of attaching the engine side and speed reducer side mounts 16, 17 on the car body frame F.

Thus, at a first step of assembling the sub-assembly, the power unit P and the sub-frame SF are connected via the torque rod 67, and at least two positions on the lower portion of the power unit P are supported via the on-board mount on the sub-frame SF. Therefore, the lower portion of the power unit P is supported via the speed reducer side lower portion mount 71 functioning as the on-board mount and the on-board mount 81 on the sub-frame SF, whereby the power unit P is assembled into the sub-frame SF in the almost same attitude as in the mounted state on the car body frame F in this example.

In FIGS. 11 and 12, the on-board mount 82 is provided to the right of the power unit F and between the power unit P and the sub-frame SF. The on-board mount 82 comprises a snap-on pin 83 as a supported member that is removably inserted into the engine E in the power unit P, a holder 84 as a supporting member that is detachably fastened into the right longitudinal member 61 provided for the sub-frame SF, and a mount rubber 85 interposed between the snap-on pin 83 and the holder 84.

An oil pan 82 provided for the engine E has an insertion hole 86 with bottom that is opened to the longitudinal member 61 of the sub-frame SF. On the other hand, the holder 84 is provided with a through bore 87 corresponding to the insertion hole 82, in which an outer cylinder 88 to which the outer circumference of the mount rubber 85 is bonded is securely fitted into the through bore 87. Also, the inner circumference of the mount rubber 85 is bonded to the snap-on pin 83, and the snap-on pin 83 is supported via the mount rubber 85 on the holder 84. And the snap-on pin 83 is integrally provided with an annular step portion 83b that can abut against the oil pan 82 from the side and a small diameter pin portion 83a projecting from the step portion 83b to be removably inserted into the insertion hole 86.

The holder 84 is fastened to a mounting plate 89 fixed to the longitudinal member 61 of the sub-frame SF. That is, the holder 84 has integrally a holding portion 84a provided with the through bore 87, and a support plate portion 84b extending forwards from the holding portion 84a, in which the support plate portion 84b is fastened to the mounting plate 89 by a single bolt 90 and a nut 91.

The nut 91 is fixed on a face of the mounting plate 89 on the side of the power unit P, and the insert holes 92, 93 corresponding to the nut 91 are provided in the mounting plate 89 and the support plate portion 84b. The bolt 90 inserted into the insert holes 92, 93 is threadingly engaged and fastened into the nut 91, so that the holder 84 is mounted on the mounting plate 89.

Also, one of the support plate portion 84b and the mounting plate 89 for the holder 84, or the mounting plate 89 in this example, is provided with a regulation hole 94 at a position offset from the axial line of the bolt 90 and the nut 91. The other of the support plate portion 84b and the mounting plate 89 for the holder 84, or the support plate portion 84b in this example, is provided with a locking pin 95 for regulating the holder 84 from rotating around the axial line of the bolt 90, when inserted into the regulation hole 94. And the regulation hole 94 is formed with a long hole in a direction orthogonal to the locking direction with the regulation hole 94 and the locking pin 95, or a longitudinal direction in this example.

The rubber contents of the mount rubber 85 provide for the on-board mount 81 and the mount rubber 74 provided for the speed reducer side lower portion mount 71 also functioning as the on-board mount are set to be smaller than the rubber contents of the mount rubbers 27, 47 provided for the engine side mount 16 and the speed reducer side mount 17.

By the way, when the power unit P is mounted on the car body frame F, at a first step of connecting the sub-frame SF to the power unit P and assembling the chassis parts such as suspension and steering to the sub-frame SF, the power unit P and the sub-frame SF are connected via the torque rod 67, and at least two positions on the lower portion of the power unit P, or two positions in this example, are supported via the speed reducer side lower portion mount 71 functioning as the on-board mount and the on-board mount 81 on the sub-frame SF, whereby the power unit P is assembled into the sub-frame SF in the almost same attitude as in the mounted state on the car body frame F.

The sub-assembly SA produced at the first step is assembled into the car body frame F provided for the car body B from below the car body B at a first station S1 on the course of conveying the car body B supported by a hanger 99 on a conveyer 98, as shown in FIG. 13. That is, at the second step, the sub-frame SF mounted on the power unit P at the first step is attached in the car body frame F of the car body B.

Further, at the third step, the power unit P is supported via the engine side mount 16 and the speed reducer side mount 17 on the car body frame F, in which the third step takes place in a second station S2 in which the car body B descends on the floor face.

After the end of the third step, at least one of the speed reducer side mount 71 functioning as the on-board mount and the on-board mount 81, or the on-board mount 81 in this example, is removed from the sub-frame SF and the power unit P.

The action of this example will be described below. In mounting the power unit P on the car body frame F, it is required to perform successively a first step of connecting the power unit P and the sub-frame SF via the torque rod 67, and supporting at least two positions on the lower portion of the power unit P (two positions in this example) via the speed reducer side lower portion mount 71 and the on-board mount 81 on the sub-frame SF to assemble the power unit P into the sub-frame SF in the almost same attitude as in the mounted state on the car body frame F, a second step of attaching the sub-frame SF to the car body frame F in a state where the power unit P is mounted at the first step, and a third step of supporting the power unit P via the engine side mount 16 and the speed reducer side mount 17 on the car body frame F.

According to this mounting assembling procedure, the power unit P is defined in the almost same attitude as in the mounted state on the car body frame F, owing to the torque rod 67 and at least two mounts of the speed reducer side lower portion mount 71 and the on-board mount 81 at the first step, and the attitude of the power unit P in the car body frame F is made definite in a state where the sub-frame SF is mounted on the car body frame F at the second step. Therefore, it is necessary to perform the third step of supporting the power unit P on the car body frame F via the engine side mount 16 and the speed reducer side mount 17, when the car body frame F on which the sub-frame SF is attached descends to the position at which the engine side mount 16 and the speed reducer side mount 17 can be attached on the car body frame F from above, whereby the remodeling of assembly line and the process review are dispensed with, and the power unit P is mounted on the car body frame F with a mount structure of torque rod type.

Also, at the first step, of the speed reduce side lower portion mount 71 and the on-board mount 81 provided between the power unit P and the sub-frame SF, the on-board mount 81 is removed from the sub-frame SF and the power unit P after the end of the third step, whereby it is possible to avoid unnecessary restriction of the power unit P to the car body frame in the entire car, suppress an unnecessary increase in the vibration transmission path between the power unit P and the car body frame F, and contribute to reduction of the weight of the entire car.

Also, because the speed reducer side lower portion mount 71 and the on-board mount 81 for use when assembling the sub-assembly SA provided between the sub-frame SF and the power unit P have the mount rubbers 74, 85, even if there is any error between the attitude of the power unit P defined by the speed reducer side lower portion mount 71, the on-board mount 81 and the torque rod 67, and the attitude of the power unit P in the mounted state on the car body frame F, it is possible to absorb the error by the mount rubbers 74, 85 of the speed reducer side lower portion mount 71 and the on-board mount 81 and mount the power unit P on the car body frame F easily and in correct attitude.

Since the rubber contents of the mount rubbers 74, 85 provided for the speed reducer side lower portion mount 71 and the on-board mount 81 are set to be smaller than the rubber contents of the mount rubbers 27, 47 provided for the engine side mount 16 and the speed reducer side mount 17, it is possible to avoid unnecessary increase in the rubber contents of the mount rubbers 74, 85 of the speed reducer side lower portion mount 71 and the on-board mount 81, and contribute to reduction of the cost.

By the way, the on-board mount comprises the snap-on pin 83 removably inserted into the power unit P, the holder 84 fastened detachably to the sub-frame SF, and the mount rubber 85 interposed between the snap-on pin 83 and the holder 84, whereby an operation of attaching and removing the on-board mount 81 that is removed at the third step is facilitated.

Moreover, since the holder 84 is fastened to the mounting plate 89 fixed to the sub-frame SF by a single bolt 90 and the nuts 91, the operation of attaching and removing the on-board mount 81 is further facilitated. And one of the holder 84a and the mounting plate 89 (mounting plate 89 in this example) is provided with the regulation hole 94 at the position offset from the axial line of the bolt 90 and nuts 91, and the other of the holder 84 and the mounting plate 89 (holder 84 in this example) is provided with the locking pin 95 for regulating the holder 84 from rotating around the axial line of the bolt 90 by being inserted into the regulation hole 94, whereby only by fastening with the single bolt 90 and nuts 91, the power unit P is blocked from being rotated around the axial line of the bolt 90 in mounting the engine side and speed reducer side mounts 16, 17 on the car body frame F, making it easier to mount the engine side and speed reducer side mounts 16, 17 on the car body frame F. In addition, since a long hole is formed in a direction orthogonal to the locking direction with the regulation hole 94 and the locking pin 95, any error between the attitude of the power unit P defined by the speed reducer side lower portion mount 71, the on-board mount 81 and the torque rod 67 and the attitude of the power unit P in the mounted state on the car body frame F is absorbed by the mount rubber 74 of the on-board mount 81, but the power unit P is freely moved at least in a limited range along the longitudinal direction of the regulation hole 94 owing to a resilient force of the mount rubber 74 in fastening the bolt 90, so that the on-board mount 81 is easily removed.

The power unit P is mounted on the vehicle in a transverse state where the drive shafts 14L, 14R extending to the left and right from the speed reducer T are disposed behind the principal axis of inertia C, in which the engine side mount 16 disposed on the principal axis of inertia C at one end along the principal axis of inertia C between the power unit P and the car body frame F, and the speed reducer side mount 17 disposed above the principal axis of inertia C at the other end along the principal axis of inertia C are interposed to share the static load of the power unit P with the mounts 16, 17, and a portion apart from the principal axis of inertia of the power unit P is connected to the car body frame F via the torque rod 58 extending almost horizontally in the longitudinal direction not to share the static load in the vertical direction, and connected to the sub-frame F via the torque rod 67 extending almost horizontally in the longitudinal direction not to share the static load in the vertical direction, so that the sub-frame F is mounted on the car body frame F. In this case, the speed reducer side mount 17 comprises a front elastic stopper 52 abutting against the support plate portion 23a of the bracket 23 attached on the car body frame F when the holder 42 attached on the top of the mission case 24 in the speed reducer T is displaced a first distance L1 to the fore side of the car body frame F, and a rear elastic stopper 53 abutting against the support plate portion 23b of the bracket 23 when the holder 42 is displaced a second distance L2 to the rear side of the car body frame F.

Accordingly, when the forward displacement of the holder 42 or the power unit P from the car body frame F is greater than or equal to the first distance L1, the front elastic stopper 52 abuts against the support plate portion 23a of the bracket 23. Also, when the backward displacement of the holder 42 or the power unit P from the car body frame F is greater than or equal to the second distance L2, the rear elastic stopper 53 abuts against the support plate portion 23b of the bracket 23. Therefore, the longitudinal displacement of the power unit P is regulated by the speed reducer side mount 17.

And during acceleration, a reaction force on the backward inclined side acts on the power unit P so that the holder 42 of the speed reducer side mount 16 is displaced rearwards, while during deceleration, a reaction force on the forward inclined side acts on the power unit P so that the holder 42 is displaced forwards. Therefore, the displacement of the holder 42 caused by fluctuation of the power unit P during acceleration and deceleration is regulated resiliently, and the fluctuation of the power unit P during acceleration and deceleration is regulated while the torque rods 58, 67 fulfill the proper function. Also, since the second distance L2 is longer than the first distance L1, the chance of regulating the fluctuation of the power unit P is reduced during acceleration in which the crew is more likely to feel a shock than during deceleration, thereby preventing the crew of the vehicle from feeling a shock as much as possible.

Also, the friction coefficient of at least a portion of the front elastic stopper 52 and the rear elastic stopper 53 in contact with the support plate portions 23a, 23b in the bracket 23 is set to be lower on the side of the front elastic stopper 52. In this example, the front elastic stopper 52 is formed of an elastic material having a lower friction coefficient than the friction coefficient of the elastic material forming the rear elastic stopper 53, whereby at the time of regulating the fluctuation during deceleration in which there is more chance of regulating the power unit P, a forward force transmitted from the holder 42 via the front elastic stopper 52 to the support plate portion 23a of the bracket is dispersed vertically, because the abutment face having lower friction coefficient abuts against the support plate portion 23a, thereby reducing the input into the torque rods 58, 67 and relieving the feeling of shock during deceleration more effectively.

By the way, though the speed reducer side lower portion mount 71 functioning as the on-board mount in connecting the power unit P and the sub-frame SF is left behind between the power unit P and the sub-frame SF in a state of the entire car, this speed reducer side lower portion mount 71 is provided not to share the static load of the power unit P between the sub-frame SF and the lower portion of the speed reducer T in a mounted state on the car body frame F to have at least the vertical spring component.

Accordingly, even if the speed reducer side mount 17 sharing the static load of the power unit P is disposed at a position offset above the principal axis of inertia C, make the car more conformable to drive, and securing the maneuvering stability. And since the elastic center of the speed reducer T can be made closer to the principal axis of inertia C, the vibration mode is changed to improve the vibration transmission characteristic.

Also, since the speed reducer side lower portion mount 71 has the mount rubber 74 having the longitudinal and transverse spring constants set to be lower than the vertical spring constants, it is possible to make the car more comfortable to drive and enhance the maneuvering stability without increasing the spring constant in the rolling direction of the power unit P.

And the speed reducer side lower portion mount 71 provided between the car body frame F and the lower portion of the speed reducer T to interpose the sub-frame SF with the car body frame F and the speed reducer side mount 17 between the upper portion of the speed reducer T and the car body frame F are opposed across the principal axis of inertia C to be beneficial to regulate the rolling of the power unit P. Moreover, the speed reducer side lower portion mount 71 is interposed between the longitudinal member 62 of the sub-frame SF attached to the car body frame F and the lower portion of the speed reducer T, and the longitudinal member 62 of the sub-frame SF has a low acoustic sensitivity and a long transmission path, whereby the speed reducer side lower portion mount 71 is interposed between the lower portion of the speed reducer T and the car body frame F with the noise of the power unit P suppressed from transmission.

Though the invention have been described above byway of example, the invention is not limited to the above embodiments, but various modifications in design may be made thereto without departing from the spirit or scope of the invention.

This application claims foreign priority based on Japanese patent application JP 2003-390973, filed on Nov. 20, 2003, the contents of which is incorporated herein by reference in its entirety.

The invention claimed is:

1. A power unit mounting assembling method for mounting a power unit including a power source and a speed reducer on a car body frame by disposing a mount carrying a static load of said power unit between said power unit and said car body frame and disposing a sub-frame attached on said car body frame between said power unit and said car body frame, said method comprising in succession:
   a first step of assembling said power unit into said sub-frame in substantially the same position as in a mounted state on said car body frame by supporting said power unit via an on-board mount on said sub-frame;
   a second step of attaching said sub-frame on which said power unit is mounted at the first step to said car body frame; and
   a third step of supporting said power unit via the mount on said car body frame,
   wherein said on-board mount is removed from between said sub-frame and said power unit after the end of said third step.

2. The power unit mounting assembling method according to claim 1, wherein said mount includes a power source side mount and a speed reducer side mount which are disposed between both end portions of the power unit along a principal axis of inertia and said car body frame to share the static load of the power unit,
   wherein said power unit is mounted on said car body frame so that a substantially horizontal torque rod is disposed between the sub-frame to be attached on said car body frame and a portion of said power unit apart from the principal axis of inertia, and
   wherein said first step includes assembling said power unit into said sub-frame in substantially the same position as in the mounted state on said car body frame by connecting said power unit and said sub-frame via said torque rod and supporting at least two positions on a lower portion of said power unit on the sub-frame via said on-board mount.

3. The power unit mounting assembling method according to claim 2, wherein said power source side mount, said speed reducer side mount and said on-board mounts comprise supported members attached to said power unit, supporting members attached to said car body frame and said sub-frame, and mount rubbers disposed between the supported members and the supporting members corresponding to each other, respectively, and
   wherein the rubber contents of the mount rubbers provided for said on-board mounts are set to be smaller than the rubber contents of the mount rubbers provided for said power source side mount and said speed reducer side mount.

4. The power unit mounting assembling method according to claim 1, wherein said on-board mount removed from between said sub-frame and said power unit after the end of said third step comprises a snap-on pin removably inserted into said power unit, supporting members detachably fastened to said sub-frame, and a mount rubber disposed between said snap-on pin and said supporting members.

5. The power unit mounting assembling method according to claim 4, wherein said supporting members are fastened to a mounting plate fixed to said sub-frame by a single bolt and a nut, one of said supporting members and said mounting plate being provided with a regulation hole at a position offset from an axial line of said bolt and said nut, the other of said supporting members and said mounting plate being provided with a locking pin for regulating said other of said supporting members from rotating around the axial line of said bolt by being inserted into said regulation hole, and said regulation hole is formed into a long hole extending in a direction orthogonal to a locking direction with said regulation hole and said locking pin.

6. A power unit mounting assembling apparatus for mounting a power unit including a power source and a speed reducer on a car body frame, a mount carrying a static load of said power unit disposed between said power unit and said car body frame, and a sub-frame attached on said car body frame disposed between said power unit and said car body frame, said apparatus comprising:

an on-board mount disposed between said power unit and said sub-frame and supported on said sub-frame in substantially the same position as in a mounted state on said car body frame; and a removal member for removing said on-board mount from said sub-frame and said power unit after supporting said power unit on said car body frame via said mount.

7. The power unit mounting assembling apparatus according to claim 6, wherein said mount and said on-board mount comprise supported members attached to said power unit, supporting members attached to said car body frame and said sub-frame, and mount rubbers disposed between the supported members and the supporting members corresponding to each other, respectively, and wherein the rubber content of the mount rubber provided for said on-board mount is set to be smaller than the rubber content of the mount rubber provided for said mount.

8. The power unit mounting assembling apparatus according to claim 6, wherein said on-board mount removed from between said sub-frame and said power unit comprises a snap-on pin removably inserted into said power unit, supporting members detachably fastened to said sub-frame, and a mount rubber disposed between said snap-on pin and said supporting member.

9. The power unit mounting assembling apparatus according to claim 8, wherein said supporting members are fastened to a mounting plate fixed to said sub-frame by a single bolt and a nut, one of said supporting members and said mounting plate being provided with a regulation hole at a position offset from the axial line of said bolt and said nut, the other of said supporting members and said mounting plate being provided with a locking pin for regulating said other of said supporting members from rotating around the axial line of said bolt by being inserted into said regulation hole, and said regulation hole is formed into a long hole extending in a direction orthogonal to a locking direction with said regulation hole and said locking pin.

* * * * *